United States Patent [19]
Richards

[11] Patent Number: 5,367,007
[45] Date of Patent: Nov. 22, 1994

[54] MULTI-LAYER COMPOSITE BLOCK & PROCESS FOR MANUFACTURING

[75] Inventor: Denis C. Richards, Mississauga, Canada

[73] Assignee: Enviropaver Inc., Brampton, Canada

[21] Appl. No.: 55,387

[22] Filed: May 3, 1993

Related U.S. Application Data

[63] Continuation-in-part of Ser. No. 804,068, Dec. 9, 1991, Pat. No. 5,221,702.

[51] Int. Cl.$^5$ .................. C08L 95/00; B32B 11/00; D06N 5/00
[52] U.S. Cl. .................. 524/59; 524/436; 524/494; 524/445; 524/425; 428/489; 404/34
[58] Field of Search .......... 524/59, 68, 36, 40, 524/34, 436, 425, 494, 445; 428/489; 404/34, 38, 41, 44

[56] References Cited

U.S. PATENT DOCUMENTS

| | | | |
|---|---|---|---|
| 917,004 | 4/1909 | Clifford | 404/44 |
| 1,281,444 | 10/1918 | Wardell | 404/44 |
| 1,629,487 | 5/1927 | Draullette | 404/44 |
| 1,704,212 | 12/1929 | Warren | 404/32 |
| 3,253,521 | 5/1966 | Endres | 117/77 |
| 3,732,791 | 5/1973 | Hohwiller | 404/31 |
| 3,891,585 | 6/1975 | McDonald | 260/28.5 |
| 4,018,730 | 4/1977 | McDonald | 260/17.4 |
| 4,130,516 | 12/1978 | Gagle et al. | 260/28.5 |
| 4,284,366 | 8/1981 | Lucik | 404/44 |
| 4,332,705 | 6/1982 | Uffner | 525/54.5 |
| 4,427,818 | 1/1984 | Prusinski | 524/442 |
| 4,659,759 | 4/1987 | Jevanoff et al. | 524/68 |
| 4,868,233 | 9/1989 | Moran | 524/71 |
| 4,873,275 | 10/1989 | Moran et al. | 524/64 |
| 4,882,373 | 11/1989 | Moran | 524/60 |
| 4,963,055 | 10/1990 | Sims, Jr. | 404/41 |
| 5,051,023 | 9/1991 | Yoshida et al. | 404/39 |

FOREIGN PATENT DOCUMENTS

| | | |
|---|---|---|
| 0014646 | 8/1980 | European Pat. Off. |
| 0356066 | 2/1990 | European Pat. Off. |
| 57-66206 | 4/1982 | Japan .................. 404/32 |

OTHER PUBLICATIONS

929 Travaux (1982) Jul.-Aug., No. 568, Paris, France, "le Béton Bitumineux Armé" 61-66.

*Primary Examiner*—Paul R. Michl
*Assistant Examiner*—La Vonda R. De Witt
*Attorney, Agent, or Firm*—Donald E. Hewson

[57] ABSTRACT

A multi-layer molded composite paving block having a first layer comprising reclaimed asphalt, thermoplastic or thermosetting plastic, monofilament fibre material and elastic material, and a second layer comprising thermoplastic such as polyethylene or thermosetting plastic, and an aggregate material, is disclosed. The first layer comprises about 75% to about 95% of the block while the second layer comprises about 5% to about 25% of the block. The plastic constituent in each of the first and second layers at opposing surfaces thereof are heat and pressure bonded with plastic constituent in the other of the first and second layers, so as to form a securely interlocked structural interface between the first and second layers, so as to thereby form a single integral structure.

15 Claims, 3 Drawing Sheets

MULTI-LAYER COMPOSITE BLOCK & PROCESS FOR MANUFACTURING

CROSS REFERENCE

This application is a continuation-in-part of application Ser. No. 07/804,068 filed Dec. 9, 1991, now U.S. Pat. No. 5,221,702.

FIELD OF THE INVENTION

This invention relates to materials for forming construction blocks and more particularly to materials for forming interlocking paving blocks used to construct roads, parking lots, driveways and the like. Specifically, decorative paving blocks are addressed.

BACKGROUND OF THE INVENTION

In North America, and indeed in most of the civilized and populated areas of the world, roads have become an integral part of cities, towns, suburbs, and so on. Indeed, most towns and cities contain hundreds or thousands of miles of roads within their boundaries, and also driveways or parking lots for virtually every building within a city or town.

The conventional way and indeed the most popular way to provide roads, driveways, and parking lots with a top surface is to use asphalt for the top surface. A best estimate is that several million miles of roads and several million acres of parking lots within North America are surfaced with asphalt.

However, there are two fundamental problems with asphalt. One problem is that asphalt is oil based, or at least largely so, and therefore a raw material that is in limited supply is being used when it could be being used for other purposes. Secondly, there is a question of durability, which is now generally recognized as a very significant problem. Many existing roadways and parking lots, even very new ones, are degraded considerably largely due to broken asphalt, and cracks or potholes can be found at any given time. The amount of asphalt roadway in North America that has asphalt damage is quite extensive. Most of the damage is caused by weather cycles, which cause expansion and contraction of the asphalt. Any roadway that does not have asphalt damage has most likely been constructed or repaired in the last few years. This is generally unsightly and also quite expensive. Further, oil and other fluids that drip from vehicles while the vehicle is parked or in motion also cause a significant problem. The amount of damage that is done by oil and other fluids from vehicles is considerable. This damage can be seen in virtually every parking lot, driveway, and roadway intersection in North America. Not only does the oil, or whatever fluid that might be leaking from a vehicle, leave a very unsightly stain on the asphalt surface of a roadway, parking lot or driveway, the asphalt surface in time will start to degrade to a point where it is crumbling and needs to be replaced.

While it is possible to replace small portions of the asphalt surface, at least in most cases, this leaves an unsightly patch—or indeed several patches—of new asphalt.

One alternative that has been recently fairly widely accepted in Noah America as an alternative for resurfacing driveways and small parking lots is interlocking blocks. Interlocking blocks are made of a cementitious or a cement based material having a small relatively constant sized aggregate therein. These blocks come in various shapes and sizes. Basically, these blocks interfit with one another such that the blocks can be installed on a surface to completely cover the surface. The blocks may need to be cut around the perimeter of a surface in order to fit exactly to the outline of the surface. Among the advantages of interlocking blocks are that they do not require the same heavy equipment to install as it takes to create a surface of asphalt, they are easy to replace, only the damaged blocks need replacing which can be done relatively quickly and inexpensively, and they last much longer than an asphalt surface and are much more resistant to damage—including weathering, impact, and leaking oil. They are, however, more expensive to install initially than an asphalt surface, although the cost factor can be spread over many more years since interlocking blocks are generally much more durable than asphalt. Further, it generally takes longer to install a given area of interlocking blocks than to pave the same area with asphalt, which adds to the initial cost. Largely because of the lower initial cost, many parking lots and driveways are still paved with asphalt instead of being surfaced with interlocking blocks. However, because of the long term cost benefits, it is becoming more and more acceptable to use interlocking blocks even where cost is an important and an accountable factor, such as in municipal roads and parking lots or shopping mall and office complex parking lots.

Another advantage of interlocking blocks is that they can, in most cases, allow for ground movement without breaking. The blocks merely shift slightly with respect to one another or in some cases separate slightly :from one another, which is usually acceptable. Further, moisture can pass between interlocking blocks which means that normal water seepage into the ground is not interfered with significantly.

A problem with the present interlocking blocks, however, is that they are cement based and therefore somewhat porous. This means that they can absorb moisture which tends to cause them to crack or break when the moisture freezes during winter weather conditions.

Although some prior art paving blocks, particularly those that are cement based, are available in a variety of colours, there is no known prior art that provides both the structural aspects of an asphalt based block which also includes plastic, rubber and the like, with the aesthetic features of other blocks, or with the aesthetic features and functional features of other materials not normally incorporated into paving blocks. For instance, at the present time, it is generally not possible to match asphalt based paving blocks to the colour of different types of building materials such as bricks, granite, natural stone, and the like. Nor is it possible to provide a paving block having a top surface including materials that are chosen only for their aesthetic properties or for their frictional or tractional properties, or for their cushioning properties but not for their structural properties. All known paving blocks are made of a single mixture that is relatively homogenous in consistency, the components of which must generally be chosen for their structural properties. It is not known to provide a paving block having a separate layer that exhibits aesthetic and mechanical properties that are different than the aesthetic and mechanical properties of the main structural layer or body of the paving block. Further, it is not known how to produce such a two layer block wherein the two layers are bonded with one another so as to form a securely interlocked structural seam therebetween.

Presently, many situations exist where present paving solutions, including interlocking blocks, are not completely satisfactory. In parking lots, for instance, cement based paving blocks may be used, but are generally not suitable as they are not rugged enough to withstand the rigour of parking lot traffic, including heavy trucks, and also snow ploughs during the winter months. Alternatively, asphalt based paving blocks can be used. However, use of strictly asphalt paving blocks would result in a black colour parking lot. While a black colour parking lot is generally acceptable, it may be desirable to have another colour available. This is especially true where other paved surfaces are concerned, such as driveways, patios, playgrounds, and so on.

What is required is an asphalt based paving block having a second top layer containing materials other than asphalt, wherein this top layer may be any suitable colour. Further, the top layer may include materials having specific properties that are desirable in specific situations. Suitably manufactured paving blocks could have a top layer that has a specific resistance to oil and salt, for example.

Such two layer paving blocks could be used to outline specific areas of a parking lot or to provide the lines between parking spaces. Further, two layer paving blocks could also be used to provide the dividing lines on public roads and the "stop lines" at intersections, and the like.

Public roadway intersections, which are known to be prone to being slippery during rainy weather due to the amount of oil that has dripped from cars could have blocks having a top layer that has very high traction characteristics so as to allow for reduced stopping distances even in slippery conditions.

Materials that are sensitive to temperature and that change colour in response to changes in temperature, could be used to indicate when temperatures are around freezing and driving conditions might be slippery.

Paving blocks having increased sound absorbency characteristics could be used on downtown city streets.

Paving blocks having a somewhat soft top layer could potentially be used playgrounds to provide a top surface having relatively high physical cushioning properties.

PRIOR ART

The prior art includes basically asphalt surfaces and interlocking paving blocks made mainly of cement based materials.

However, several patents relating generally to the subject matter hereof are discussed below, for the record:

U.S. Pat. No. 1,740,212 issued Dec. 17, 1929 to WARREN, discloses a bituminous composition and the manufacture thereof. This bituminous composition comprises an admixture of rubber with bituminous cement. Further, an admixture of fibre is added thereto.

U.S. Pat. No. 3,253,521 issued May 31, 1966 to ENDRES, discloses a flexible paving composition wherein to surface a roadway, a rubberized bituminous adhesive is applied to the surface and then a cover of paving composition is applied thereto, while the adhesive is in a condition to adhere the composition to the surface. The paving composition comprises a mixture of rubberized bitumen and particulated rubber.

U.S. Pat. No. 3,891,585 issued Jun. 24, 1975 to MCDONALD, discloses an elastomeric pavement repair composition wherein asphalt is heated and rubber is combined therewith. The resulting composition is mixed to form a hot jellied composition which can be applied to cracked or distressed pavements.

U.S. Pat. No. 4,284,366 issued Aug. 18, 1981 to LUCIK, discloses an elastomeric composite pavement wherein a molded paving unit is formed as a composite of a resilient base material and a friction aggregate. The particles of the aggregate are disposed in the base material throughout the thickness of the paving unit. The resilient base material includes a binder material such as rubber—more specifically EPDM. Alternate layers of friction aggregate and elastomeric binder material are laid into a cavity to form the molded paving unit.

U.S. Pat. No. 4,427,818 issued Jan. 24, 1984 to PRUSINSKI, discloses a thermoplastic polymer concrete structure and method wherein a thermoplastic polymer concrete block is constructed of contaminated thermoplastic resin scrap, and fill material. The fill material may include sand particles, fibrous particles such as threads, and other waste materials such as metal chips. The mixture is heated and mixed and then placed into molds of a desired shape, and ultimately cooled.

U.S. Pat. No. 4,868,233 issued Sep. 19, 1989 to MORAN, discloses a polyethylene modified asphalt wherein certain linear polyethylene compounds are added to an asphalt that is low in asphaltenes but relatively high in saturates. The resulting composition has excellent storage stability, face compatibility and creep resistance relative to unmodified asphalts. The improved asphaltic composition is particularly well suited for use as a binder in paving materials and as a coating or saturant for roofing products.

In U.S. Pat. No. 4,873,275 issued Oct. 10, 1989 to MORAN et al, it is disclosed that paving asphalts (especially of the hot mix, hot laid type) may be modified so as to have improved stability and rheological properties by the addition of certain co-polymers of ethylene with a vinyl acetate or lower alkyl esters of acrylic acid and methacrylic acid to the asphalt, provided the asphalt has an asphaltene content below a critical level. More specifically, an asphalt cement or binder having both enhanced storage stability and creep resistance relative to conventional binders is formed when the asphalt used in the binder has an asphaltene content of about 7% (by weight) or less, based on percentage of weight of the asphalt. One embodiment disclosed provides an improvement in paving structures wherein the binder in the structures comprises an asphalt containing about 7% (by weight) or less asphaltenes and from about 3.5% to about 10% (by weight) of a co-polymer of ethylene, and from 3% to about 30% (by weight) vinyl-acetate, alkyl acrylate or alkyl methacrylate. Another embodiment of the invention incorporates into the asphalt used in the binders, from about 3.5% to about 10% by weight of a co-polymer of ethylene which contains from 3% to about 30% (by weight) vinyl-acetate, alkyl acrylate or alkyl methacrylate. The composition disclosed in the patent is said to be particularly suitable for use as a binder in the load bearing course as well as the top or surface course of pavement structures, particularly hot mix pavement structures.

U.S. Pat. No. 4,882,373 issued Nov. 21, 1989 to MORAN, discloses that an asphaltic composition comprising a mineral acid, a thermoplastic elastomer and an unsaturated functional monomer, has improved tensile properties relative to that obtained in the absence of the unsaturated functional monomer.

Japanese Patent Publication 57-66206 published Apr. 22, 1982 discloses a method of manufacturing asphalt by using a hot asphalt mixture combined with a pasty rubber composition. The rubber composition consists of a 2:1 to 1:3 mixture of a rubber latex and a powdery polyolefinic polymer, having a melt index of 20 to 400 and a grain size of 0.3 mm. or less.

The known prior art does not disclose a two layer paving block, with the bottom layer comprising reclaimed asphalt, plastic material such as polyethylene, and an elastomeric material all forming a first composite material, with the first composite material having the normal structural characteristics required of paving blocks, and with the top layer having polyethylene and aggregate material forming a second composite material, having different characteristics than the first composite material that forms the bottom layer.

SUMMARY OF THE INVENTION:

The present invention provides a two layer molded paving block that is to be used in the surfacing and resurfacing of roads, parking lots, sidewalks and other walkways, airport runways, taxiways, and tarmacs, and the like. Such two layer paving blocks can also be used to outline specific areas of a parking lot, to provide the lines between parking spaces in a parking lot, to provide an oil and salt resistant surface, to provide dividing lines on public roads and the "stop lines" at intersections, to provide a high traction surface for use in intersections, to provide surfaces that change colour in response to temperature for indicating freezing temperatures, to provide paving blocks having increased sound absorbency characteristics, and to provide a soft top layer having relatively high physical cushioning properties for use in playgrounds and the like. Moreover, two layer molded paving blocks of the present invention will provide generally decorative paving blocks having a top layer of almost any colour or general appearance.

Preferably, the molded paving blocks of the present invention will be in the shape of a rectangular prism—basically the same shape as a typical brick that is used in the construction of a building. Other shapes can, of course, be manufactured and used.

The materials used to form the first layer—the bottom layer—are preferably previously used materials such as reclaimed asphalt, recycled plastic such as polyethylene containers, reclaimed elastomeric material such as rubber from scrap tires, and reclaimed monofilament fibre material such as nylon, rayon, or KEVLAR TM cords from scrap tires. There are many advantages to using reclaimed or recycled materials such as reduction of waste and also lower cost of raw materials.

The materials used to form the second layer—the top layer—are preferably scrap or recycled polyethylene, and an aggregate material of almost any type and may include of crushed bricks, crushed concrete, crushed clay tiles, slate, steel slag, cullet glass, limestone, basalt, quartz, granite, gravel, and marble. There are many advantages to using recycled polyethylene materials, such as reduction of waste and also lower cost of raw materials. There are advantages to using scrap virgin polyethylene, which is polyethylene that has been removed during a manufacturing process and is therefore scrap, but is still pure polyethylene of known content, in that this scrap material would otherwise need to be discarded. Further, specific colours of polyethylene can be used, which is not possible in using recycled polyethylene—except at a high pre-sorting cost of recovery.

The proportional amounts of constituents in the first composite material that make up the bottom layer include reclaimed asphalt from road re-surfacing, asphalt shingles and/or asphalt/gravel roof membranes or any other suitable source in a proportion of about 25% to about 95% by volume, polyethylene in a proportion of about 2% to about 40% by volume, monofilament fibre material in a proportion of about 2% to about 35% by volume, and elastomeric material in a proportion of 0% to about 30% by volume. The proportional amounts of constituents in the second composite material that makes up the top layer include polyethylene in a proportion of about 20% to about 100% by volume, and an aggregate material in a proportion of about 0% to about 80% by volume. The proportions of the materials that make up the composite material must of course add up to 100%.

The reclaimed asphalt should generally be the main or prevalent constituent of the first composite material that forms the bottom layer composite block of the present invention. The reclaimed asphalt provides the mass and strength of the composite material due to the aggregate within the asphalt. Further, the asphalt contains resins composed largely of hydrocarbons. Reclaimed asphalt from roof tiles or roof membranes contains fibrous material. These hydro-carbons and fibres intermingle and bond with the plastic, which is preferably polyethylene, thus creating a binding agent within the material. Further, the plastic physically stabilizes the asphalt and therefore precludes deformation due to extreme temperatures. The monofilament fibres act to reinforce the binding agent thereby providing additional strength to the composite material. The elastomeric material—typically rubber—acts as a flexural extender and thereby provides a measure of resilience to the composite material. It is also quite acceptable to use flexible polyvinylchloride in place of rubber as the elastomeric material. The enhanced resilience lessens the chance of the composite block cracking or breaking due to extreme temperatures or due to high loads or impact forces.

The polyethylene is the main constituent of the second composite material that forms the top layer of the composite block of the present invention. The aggregate, or any other materials added, give the second layer its aesthetic and textural characteristics, or other characteristics, as required.

The polyethylene constituent in each of the first layer and second layer that is at opposed surfaces in the first layer and the second layer is heat and pressure bonded with one another.

In one embodiment of the invention, the first and second composite materials are entered into the respective heating oven in separate portions of a pre-determined weight. The portions are separated to the correct weight by a computer controlled batch dispensing system.

In another embodiment the first and second composite materials are entered into the respective heating oven as a continuous ribbon of material. Upon exiting the oven, the material is pre-plasticized and extruded and is then cut into portions of precise volume. These portions of composite material are then deposited into the molding system.

BRIEF DESCRIPTION OF THE DRAWINGS

Embodiments of the present invention will now be described by way of the accompanying drawings, in which.

DETAILED DESCRIPTION OF THE PREFERRED EMBODIMENTS

Figure 1:
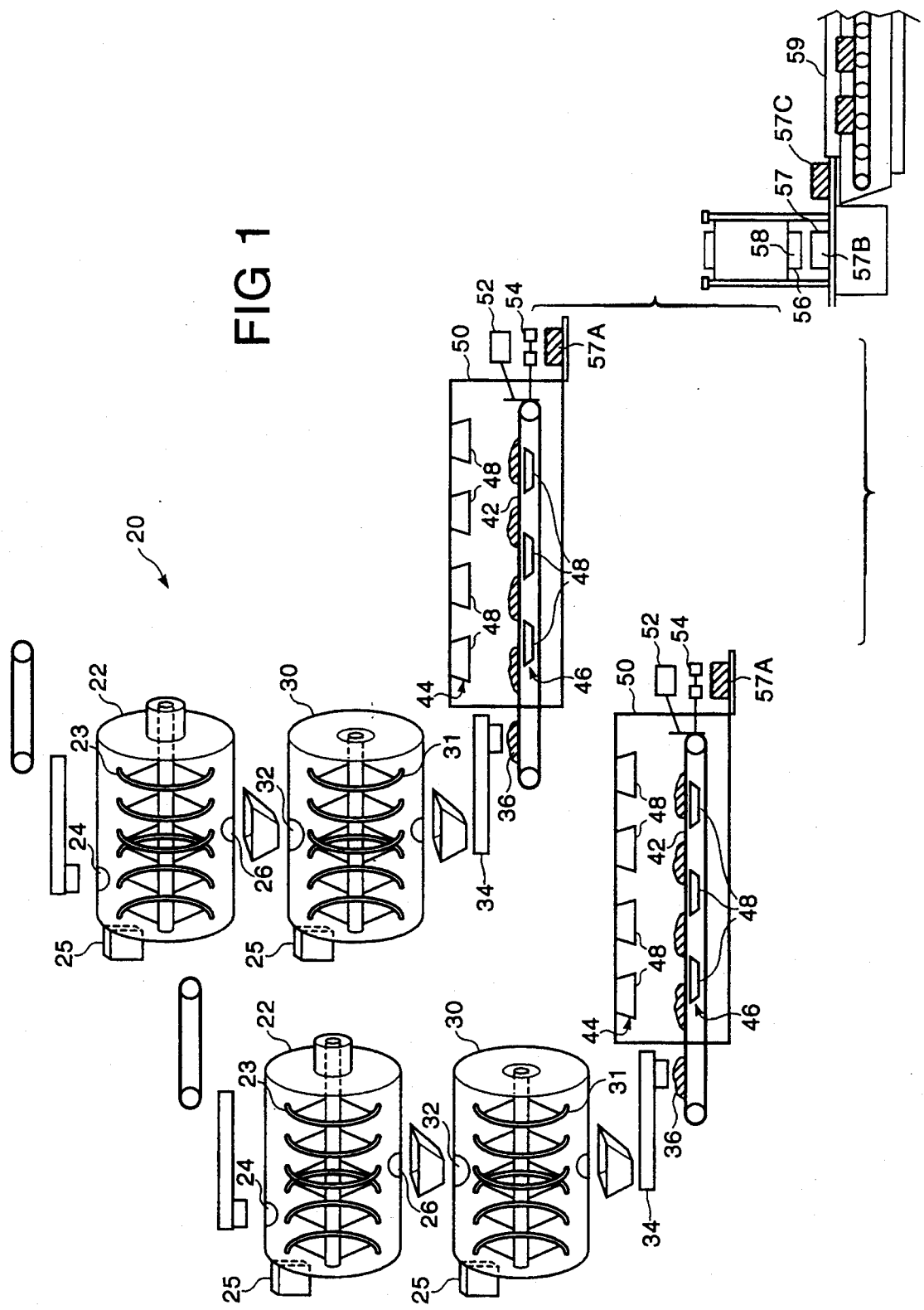
FIG. 1 is a schematic diagram of a first process used to produce the molded paving block of the present invention.
Figure 2:
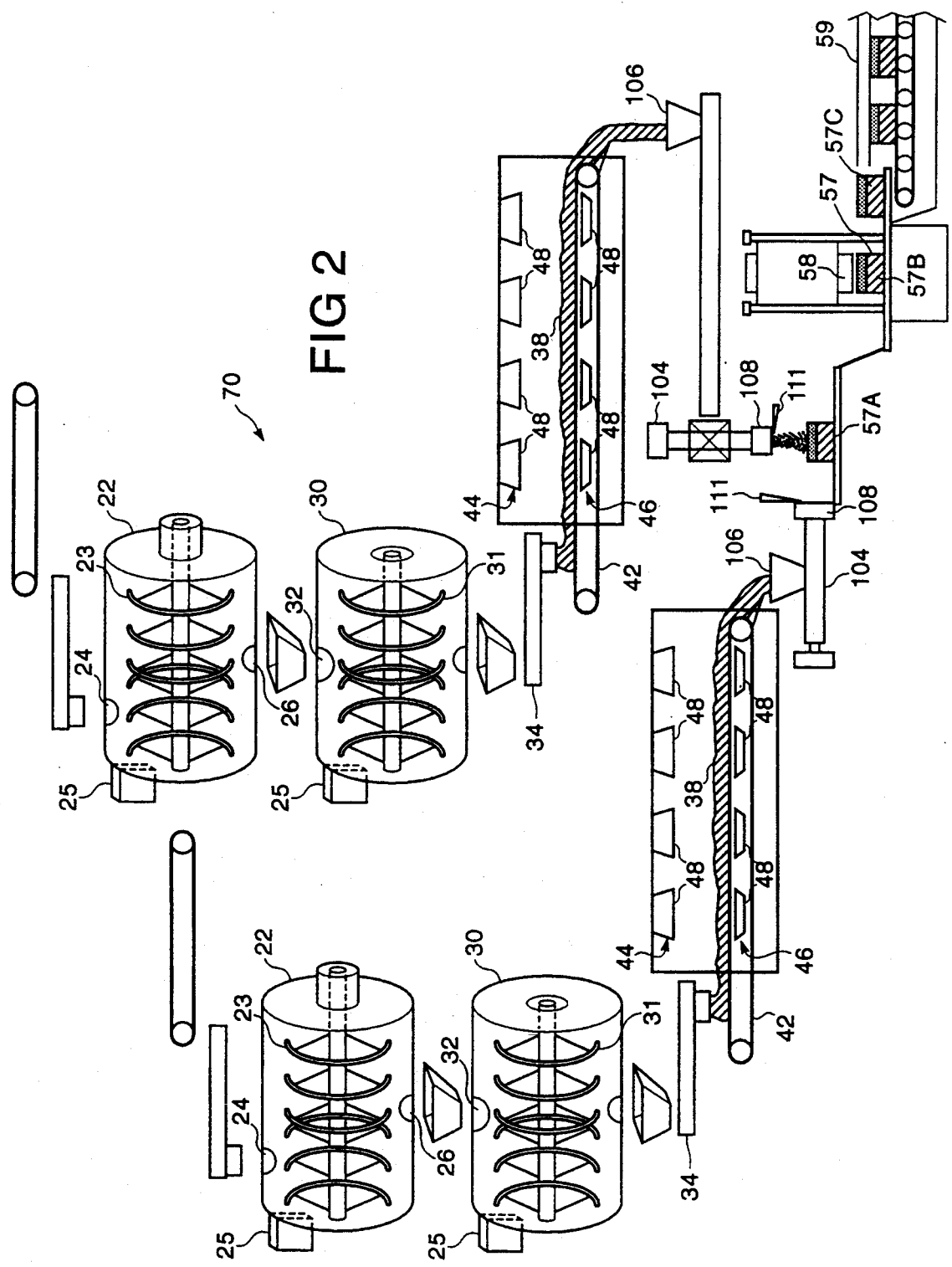
FIG. 2 is a schematic diagram of a second process used to produce the molded paving block of the present invention.
Figure 3:
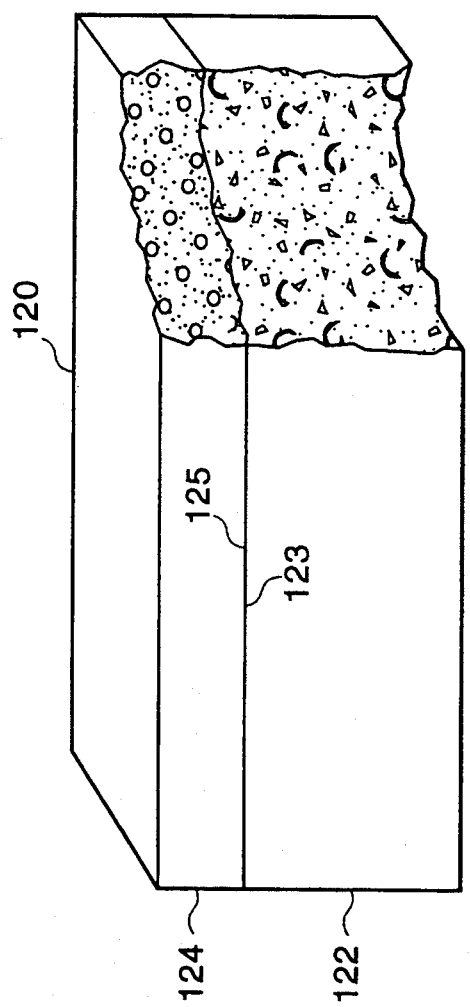
FIG. 3 is a partially cutaway view of the molded paving block of the present invention.

In the detailed description, FIGS. 1 and 2 provide schematic representations of processes used to form each of the first and second layers of the composite paving block of the present invention. FIG. 3 shows a typical multi-layer molded composite paving block 122, having a first layer 122 and a second layer 124, according to the present invention and formed by either of the methods of the present invention as shown in FIGS. 1 and 2, or by other similar methods that also fall within the scope of the present invention. The constituents and other specifics of the first layer 122 of the paving block 120 and the methods used to form that first layer are disclosed in the parent patent, U.S. Pat. No. 5,221,702, to this continuation-in-part application. The materials used in the first composite material that forms the first layer of the composite paving block must be processed separately from the materials used in the second composite material that forms the second layer of the composite paving block until the two composite materials are introduced separately into a molding system. Resultingly, separate partial production lines are used in the blending together and processing of each of the first composite material and the second composite material before the materials are fed into the molding system. These separate partial production lines that separately blend and process the first and second composite materials before these composite materials are deposited into the molding system are essentially the same, or at least function in the same manner, depending on the exact materials that are being processed for each of the first and second layers of the composite paving block. Therefore, like reference numerals will be used to denote like components in the separate partial production lines. Only one of the separate partial product lines will be referred to in the specification so as to avoid needless repetition. A first preferred embodiment of the production line is production line 20, as shown in FIG. 1. A second preferred embodiment of the production line is production line 70, as shown in FIG. 2. Like reference numerals refer to like components in both Figures.

At the start of production line 20, there is a ribbon blender 22 having rotating paddles 23 therein for blending the mixture in the ribbon blender. The various materials that are the components of the resulting composite material are entered into the ribbon blender 22, generally one at a time. In the preferred process, the ribbon blender 22 for the first composite material contains a mixture of asphalt, plastic, monofilament fibre material and elastomeric material for the first layer of the composite paving block and for the second composite material contains plastic and an aggregate material for the second layer of the composite block. The particular mixture is blended in the rotating ribbon blender 22 until the various component materials are suitably blended together, as will be described in more detail subsequently.

The asphalt is preferably reclaimed asphalt that has been crushed and subsequently screened such the that the pieces are of a size of $-4$ mesh and up to $-\frac{3}{8}$ mesh. The mesh measurement used is an industry standard Tyler mesh. The term $-4$ mesh refers to fragmented or particulate material having a particle size of less than 4 mesh, so as to pass therethrough.

The plastic is preferably recycled crushed plastic and should be of a size of $-30$ mesh to $-\frac{1}{4}$ mesh. The preferred plastic material is polyethylene, however, phenolic resins may also be used. The polyethylene is preferably recycled polyethylene, which can readily be obtained from municipal recycling programs. It is common to reclaim several types of plastic through recycling programs, with polyethylene, and inclusion of these other types of plastics in a small amount is not detrimental to the properties of the resulting end material that ultimately forms the paving block. Unexpectedly, it has been found that inclusion of other types of plastics in fairly large proportions—even as much as 30% of the entire plastic content, with the rest being polyethylene—has produced an acceptable resulting end material. Tests have shown that paving blocks made of such material merely have a lower strength, but in general retain a similar structural integrity to those blocks containing virtually 100% polyethylene as the plastic material.

The monofilament fibre material is preferably reclaimed monofilament fibre material that has been reclaimed from sources such as scrap tires and/or the fibre combined in asphalt shingles or roof membranes and is typically recovered from the tires by a cryogenic process. Preferably, the material is chosen from the group of rayon, nylon, and similar polyesters. Further, the monofilament fibre material should have a strand length preferably between $\frac{1}{4}''$ and $\frac{3}{8}'$ with the ideal strand length being around $\frac{1}{4}'$. The monofilament strands recovered from scrap tires may be cut to this length by use of a suitable grinder.

Alternatively, the monofilament fibre may be obtained from "automotive fluff", which is the fibrous material from the seats, carpets and so on of vehicles, and is obtained from scrap vehicles when the metal and plastic have been removed. The fibrous material is cut into small strands that appear fluffy when bunched together. Further, the monofilament fibre may be obtained from recycled drinking box containers such as those sold as and generally known as TETRAPAKS™.

The monofilament fibre material is blown into the ribbon blender 22 when the other component materials, or at least most of the other component materials, are in the ribbon blender 22 and while the rotating paddles 23 are rotating in order to achieve proper dispersion of the materials.

The elastomeric material is preferably reclaimed rubber that has been reclaimed from sources such as scrap tires. The preferred process for producing such reclaimed rubber is a cryogenic process, which is well known in the industry. The rubber that is produced by a suitable cryogenic process or a suitable ambient reduction process, is preferably crumb rubber that is free from other materials found in the tires. The particles of crumb rubber should be of a size of $-12$ mesh. It is also quite acceptable to use flexible polyvinylchloride as the elastomeric material. Recycled PVC may be obtained from sources such as companies that strip the PVC from strap wire and cable.

These materials are entered into the respective ribbon blenders 22 through a receiving hatch 24. The asphalt, polyethylene, and elastomeric material can be deposited separately from one another, or all together, as is convenient. It is preferable, as stated previously, to have the monofilament fibre material blown into the ribbon blender 22. It is important that the materials for each of the first and second layers be in certain proportions within the ribbon blender 22. For the first layer, the preferred proportions are about 40% asphalt, about 25% plastic, about 20% monofilament fibre material and about 15% elastomeric material, and are all expressed in terms of percent by volume. An acceptable range for each of these materials is from about 25% to about 95% asphalt, from about 2% to about 40% plastic, from about 2% to about 35% monofilament fibre material and from about 0% to about 30% elastomeric material. The percentages of course add up to 100%. For the second layer, the preferred proportions are about 70% plastic and about 30% aggregate material, and are all expressed in terms of percentage by volume. An acceptable range is from about 20% to about 100% plastic, and from about 0% to about 80% for the aggregate material.

After all of the materials have been placed in the heated ribbon blender 22, rotating paddles 23 are rotated in order to blend the materials together into a uniformly distributed mixture. The rotating paddles 23 must be rotated at a speed of between 10 r.p.m. and 35 r.p.m. in order to blend the materials properly such that the materials become evenly dispersed throughout the mixture. It has been found that the rotating paddles 23 should not be rotated faster than 35 r.p.m. because severe dusting of the materials can occur. The ribbon blender 22 is heated by way of hot air blown therethrough from a blower 25 in order to drive off excess moisture in the plastic, asphalt and the elastomeric material. It has been found that a temperature of about 40° C. is useful in providing the proper heat for causing the excess moisture to be vaporized. It is useful in terms of energy efficiency to have water removed at this stage so that it will not absorb heat energy in a subsequent heating stage. Some fluidizing of the mixture occurs, but the mixture does not reach complete fluidity.

The mixture is thoroughly blended in the ribbon blender 22, so that the materials become evenly dispersed to form a composite material that will be properly stabilized—with respect to chemistry and dimensions—when a paving block is ultimately formed. The composite material is removed from the heated ribbon blender 22 through a discharge port 26, and is fed by gravity into a heated ribbon blender 30 through a receiving hatch 32. The ribbon blender 22 is stopped so that the material can be removed. Alternatively, it is possible to use a continuous extractor, such as a screw feed type extractor, to remove the composite material from the ribbon blender 22 through an opening in the end thereof, while the ribbon blender 22 is either stopped or rotating.

The ribbon blender 30 has rotating paddles 31 therein that preferably rotate during the processing operation in order to keep the various components in the composite material from separating. The preferred rotational speed of the rotating paddles 31 is generally in the same speed range as the rotating paddles 23 within the ribbon blender 22, or in a slightly slower speed range, below 10 r.p.m. The ribbon blender 30 is also heated by a blower 25.

The composite material is removed from the ribbon blender 30 generally on a continuous basis, either as the rotating paddles 23 are rotating or when they are stopped. The ribbon blender 30 acts as a physical buffer for the composite material so that a generally continuous supply of the composite material can be provided to the remainder of the system. The overall process described herein will of course work without the ribbon blender 30, but the output in terms of number of blocks per unit time will not be maximized.

From the ribbon blender 30, the composite material is metered through a discharge port 26 into a receiving hopper 34 of a computer controlled batch dispensing system. The batch dispensing system continuously measures the amount of the composite material in the receiving hopper 34. When the proper amount of material for forming the appropriate layer of one moulded paving block has been received by the receiving hopper 34 the material is removed from the receiving hopper as a discrete portion of composite material 36, and is deposited into a continuous feed heating oven 40. The continuous feed oven 40 is shown in ghost outline so that the components therein may be more clearly seen.

The portions of composite material 36 are deposited on a PTFE coated steel belt 42 in the continuous feed oven 40. It is preferable that the portions of composite material 36 deposited on the PTFE coated steel belt 42 be about one-half inch thick so that subsequent heating of the portions of material 36 can take place rapidly. In order to accomplish this, the portions of composite material 36 are levelled to the desired height of $\frac{1}{2}''$ by a bridge as they enter the continuous feed oven 40.

The subsequent heating of the portions of composite material 36 occurs in the following manner: Within the continuous feed oven 40, there is a first series 44 of gas fired radiant heaters 48 located above the portion of the PTFE coated steel belt 42 that carries the portions of material 36 through the oven 40. This first series 44 of heaters 48 directly heats the mixture from above. There is also a second series 46 of heaters 48 below the lower portion of the PTFE coated steel belt 42. This second series of heaters 48 heat the portions of composite material 36 through the two layers of steel belt 42. The heaters in both the first series 44 and second series 46 of heaters 48 are preferably evenly spaced along the belt 42 with the number of heaters 48 being such that the heaters are placed close to one another so as to ensure even heating along the entire length of the belt 42.

After each portion of composite material 36 has passed through the continuous feed oven 40, they reach an outlet opening 50 and are removed from the steel belt 42 preferably by a computer controlled plough 52. The plough 52 removes each portion of material 36 from the belt 42 and directs each portion of material 36 into a heated receiving hopper 54 of an automatic batch discharge system. The amount of material in each portion 36 is, of course, the desired amount for forming the first layer of the molded paving block.

The portion of composite material 36 is then dumped from the receiving hopper 54 into a molding system where it is molded into a paving block. The molding system includes a mold 56, which in turn comprises a mold cavity 57 and mold plate 58. The mold cavity 57 receives the portion of composite material 36 therein when it is in position 57A. The mold cavity 57 is then moved underneath the mold plate 58 to position 57B. In the case of the material for the first layer of the composite paving block, which material is deposited into the mold cavity 57 first before the material for the second layer of the composite paving block, it may be preferable to level the top of the first layer by way of pressing the material down slightly. It is important not to compress the material at this stage, since this will induce unwanted bonding of plastic molecules to one another at the top of the material, which is undesirable, since these plastic molecules at the top of the material must bond with molecules of the plastic in the material of the second layer of the composite paving block. Such levelling of the top of the first layer is mainly for aesthetic reasons. It is possible to leave the top of the first layer uneven if desired, and if acceptable in the finished product. The material for the second layer of the composite paving block is then introduced in the mold 57 on top of the material for the first layer of the composite paving block. The mold plate 58 is then introduced to the mold cavity 57 by a hydraulic ram and a seal is formed between the two. The mold plate 58 directly contacts the portion of material 36 therein. A pressure of about 5200 kPa is applied in order that the material is formed properly into the desired shape of a molded composite paving block. The mold cavity 57 is then moved to position 57C where the molded paving block is discharged onto a water bath cooling conveyor 59, where they are quickly cooled for handling purposes. The resulting paving block has a compressive strength of about 50,000 kPa.

As can be seen in FIG. 3, the preferred shape of the paving block 120 is a rectangular prism, with the preferred sizes of these rectangular prism paving blocks being 200 mm long × 100 mm wide × 60 mm deep, and 200 mm long × 100 mm wide × 80 mm deep. With these rectangular prism paving blocks, a herringbone pattern can be created. A herringbone pattern has been found to be a preferable pattern for forming a road or other surface from rectangular prism blocks. Of course, virtually any suitable size block could be produced by the method disclosed herein.

Reference will now be made to FIG. 2 which shows a second preferred process used to form the composite paving block of the present invention at production line 70. In this second preferred process, the composite material is discharged from the ribbon blender 30 in the form of a continuous ribbon 38 of composite material. This continuous ribbon 38 of composite material is deposited onto the travelling belt 39 of the heating oven 40, wherein the continuous ribbon 38 of composite material is allowed to temperature stabilize at a temperature of about 195° C. to about 225° C. The continuous ribbon 38 of composite material is then discharged into an extruder 104 through an opening 106 in the top thereof. The composite material is extruded through a die 108 from the extruder 104 on a continuous basis. The extruded material is cut into slugs 110 of a desired size by a computer controlled cutting blade 111. The extruder 104 is preferably a linear extruder (as shown) with the piston of the extruder 104 being driven by hydraulic power. The extruder may also be a screw extruder, as dictated by performance and cost considerations. The main reason for the extruder is to preplasticize the composite material and force any gases from the material, before the pressurization in the mold.

The extruder is also preferably heated to the mixture at a temperature of about 195° C. to about 225° C. thereby allowing it to be more easily extruded. In any event, the extruder is preferably heated to keep the portion of composite material 36 at a proper temperature.

The slug 110 is then taken from the die 108 and placed into a mold 56 and is molded and subsequently cooled as described in the first preferred embodiment.

The paving block of the present invention preferably has vertically oriented sides so that when the blocks are assembled together to form a road or other surface, they can be moved in a vertical direction into location one next to another. Assembly of a road or other surface from blocks with vertically oriented sides provides a surface wherein individual blocks can be removed and replaced generally independently one from another.

The paving block 120 of the present invention may also be of a shape other than the rectangular prism shape as disclosed in the preferred embodiment. In any event, the paving blocks 120 are placed juxtaposed one to another so as to interfit one with another, in order to form a road or other surface. The paving blocks 120 do not actually interlock as do the pieces of a typical jigsaw puzzle.

The paving block 120 of the present invention, as shown in FIG. 3, has a first layer 122 comprising reclaimed asphalt in a proportion of about 50% by volume, polyethylene in a proportion of about 20% by volume, monofilament fibre material in a proportion of about 15%, and elastomeric material in a proportion of about 15%. The second layer 124 is made of a second composite material comprising polyethylene in a proportion of about 70% by volume and crushed steel slag in a proportion of about 30% by volume. The steel slag is usually, very difficult to recycle and typically ends up in a dump or landfill site. Use as a constituent in the paving block of the present invention, allows crushed steel slag to be utilized in a useful manner. The second layer 124 of second composite material, in place of the steel slag, may utilize an aggregate material that is chosen from the group of crushed bricks, crushed concrete, crushed clay tiles, slate, steel slag, cullet glass, limestone, basalt, quartz, granite, gravel, and marble.

The first layer 122 and the second layer 124 have respective opposing surfaces 123, 125. The thermoplastic constituent at each of these opposed surfaces 123, 125 are heat and pressure bonded with thermoplastic at the other of the opposed surfaces 123, 125. In this manner, a securely interlocked structural interface between the first layer 122 and the second layer 124 is formed, so as to thereby form a single integral structure.

It is also contemplated that the first composite material used in the present invention could include phenolic resin in a proportion of about 2% to about 40% by volume, instead of polyethylene.

In an alternative embodiment, the continuous feed oven has in it a conveyor belt with a plurality of generally contiguously placed trays thereon, in place of the PTFE coated steel belt as described in the preferred embodiment. Segments of the composite material would be placed in each tray on the conveyor, and would be conveyed in the same manner through the oven.

Other modifications and alterations may be used in the design and manufacture of the paving block of the present invention without departing from the spirit and scope of the accompanying claims.

What is claimed is:

1. A multiple-layer molded composite paving block for use in paving roads, parking lots and driveways, comprising:
   a first layer of a first composite material comprising reclaimed asphalt in a proportion of about 25% to about 95% by volume, a thermoplastic constituent in a proportion of about 2% to about 40% by volume, monofilament fibre material in a proportion of about 2% to about 35% by volume, and elastomeric material in a proportion of about 0% to about 30% by volume; and
   a second layer of a second composite material comprising a thermoplastic constituent in a proportion of about 20% to about 100% by volume, and an aggregate material in a proportion of about 0% to about 80% by volume;
   wherein said first and second layers contact each other in intimate association at opposed surfaces;
   wherein said first layer comprises from about 75% to about 95% of the total volume of said composite paving blocks;
   wherein said second layer comprises from about 5% to about 25% of the total volume of said composite paving blocks;
   wherein said thermoplastic constituent in either of said first and second layers is chosen from the group consisting of phenolic resin, polyethylene, and a polyethylene blend having at least 10% polyethylene; and
   wherein at least a portion of the thermoplastic constituent of each of said first and second layers at said opposed surfaces thereof are heat and pressure bonded with thermoplastic constituent in the other layer of said first and second layers so as to form a securely interlocked structural interface between said first and second layers, so as to thereby form a single integral structure.

2. The multiple-layer molded composite paving blocks of claim 1, wherein said thermoplastic constituent in said second layer is chosen from the group consisting of virgin polyethylene, scrap virgin polyethylene, scrap virgin polyethylene of a unitary or multi-varied color, and recycled polyethylene.

3. The composite paving block of claim 1, wherein said aggregate material is chosen from the group consisting of crushed bricks, crushed concrete, crushed clay tiles, slate, steel slag, cullet glass, limestone, basalt, quartz, granite, gravel, and marble.

4. The composite paving block of claim 1, wherein, in said first layer, said thermoplastic constituent is polyethylene.

5. The composite paving block of claim 1, wherein, in said first layer, said elastomeric material is rubber.

6. The composite paving block of claim 1, wherein, in said first layer, said thermoplastic constituent is recycled polyethylene, said elastomeric material is reclaimed elastomeric material, and said monofilament fibre material is reclaimed monofilament fibre material.

7. The composite paving block of claim 1, wherein, in said first layer, said elastomeric material is chosen from the group consisting of rubber, reclaimed rubber from scrap tires, and flexible polyvinylchloride.

8. The composite paving block of claim 1, wherein said monofilament fibre material is obtained from the group consisting of cords from scrap tires, automotive fluff, recycled drink containers, and asphalt shingles and asphalt/gravel roof membranes.

9. The composite paving block of claim 1, wherein said first layer of said block has a compressive strength of about 50,000 kPa.

10. A process for manufacturing a multiple layer composite molded paving block having a first layer of a first composite material comprising reclaimed asphalt in a proportion of about 25% to about 95% by volume, a thermoplastic constituent in a proportion of about 2% to about 40% by volume, monofilament fibre material in a proportion of about 2% to about 35% by volume, and elastomeric material in a proportion of about 0% to about 30% by volume; and a second layer of a second composite material comprising a thermoplastic constituent in a proportion of about 20% to about 100% by volume, and an aggregate material in a proportion of about 0% to about 80% by volume; said process comprising the steps of:
   (a) placing a predetermined amount of asphalt and a predetermined amount of polyethylene into a first heated blending drum;
   (b) heating and blending said asphalt and said thermoplastic constituent at a temperature of about 130° C. until a relatively uniform mixture is achieved;
   (c) adding a predetermined amount of elastomeric material, if required, and a predetermined amount of monofilament fibre material to said relatively uniform mixture, heating and blending the resulting mixture at a temperature of about 130° C. until a further relatively uniform mixture is achieved, so as to obtain said first composite material that is subsequently to be formed into said first layer of said composite paving block;
   (d) discharging said first composite material into a first heating oven;
   (e) allowing said first composite material to temperature stabilize in said first heating oven at a temperature of about 195° C. to 225° C.;
   (f) placing a predetermined amount of aggregate, if required, and a predetermined amount polyethylene into a second heated blending drum;
   (g) heating and blending said aggregate and polyethylene at a temperature of about 55° C. until another relatively uniform mixture is achieved, so as to thereby obtain said second composite material that is subsequently to be formed into said second layer of said composite paving block;
   (h) discharging said second composite material into a second heating oven;
   (i) allowing said second composite material to temperature stabilize in said second heating oven at a temperature of about 195° C. to 224° C.;
   (j) discharging a portion of said first composite material from said first heating oven and depositing said discharged portion of said first composite material into a mold so as to form said first layer of said molded paving block;
   (k) discharging a portion of said second composite material from said heating oven and depositing said discharged portion of said second composite material into said mold onto said first layer of said first composite material;
   (l) closing said mold; and
   (m) applying a pressure of about 5200 kPa to said mold until said portion of said first composite material has set so as to mold said portion of said first composite material into said first layer, and until said portion of said second composite material has set so as to mold said portion of said second composite material into said second layer, and such that said first and second layers are formed so as to have respective first and second opposed surfaces, with at least a portion of the polyethylene constituent of each of said first and second layers at said opposed surfaces thereof being heat and pressure bonded with one another so as to form a securely interlocked structural interface between said first and second layers.

11. The process of claim 10, further comprising the step of:

(n) after the step (j) and before the step (k), levelling the top surface of said portion of said first composite material.

12. The process of claim 10, wherein said asphalt is waste reclaimed asphalt, said polyethylene is recycled polyethylene, said elastomeric material is reclaimed elastomeric material, and said monofilament fibre material is reclaimed monofilament fibre material.

13. The process of claim 12, wherein said elastomeric material is reclaimed rubber from scrap tires, said monofilament fibre material is obtained from the cords of scrap tires, said elastomeric material is reclaimed flexible polyvinylchloride.

14. The process of claim 10, wherein said portions are determined by a weighing apparatus.

15. The process of claim 10, wherein said portions are determined by an extruder that extrudes a pre-determined volume of material.

* * * * *